United States Patent Office 3,133,904
Patented May 19, 1964

3,133,904
MOLECULAR COMPLEXES OF HALOGEN AND CYCLIC CARBAMATE
William F. Tousignant and Wilhelm E. Walles, Midland, Mich., assignors to The Dow Chemical Company, Midland, Mich., a corporation of Delaware
No Drawing. Filed May 22, 1959, Ser. No. 814,966
6 Claims. (Cl. 260—88.3)

The present invention is directed to novel complexes characterized in part by the fact that in each smallest unit of such complex there are combined on the one hand at least one atom of a halogen and, on the other hand, at least one molecule of an N-alkenyl cyclic carbamate compound. The complexes are useful as pesticides.

A full, clear, concise and exact description of the present invention is greatly facilitated by the use uniformly throughout the instant specification and claims of certain words newly coined by established etymologic adaptations of known roots, as follows:

The known noun complex is used herein in strict accord with one of its known meanings, to designate, in a generic or specific sense, substances such as those of the present invention; substances composed of halogen atoms bonded together with molecules by forces not so strong as covalent bonds but strong enough that the present complexes are stable under ordinary conditions. Such bonding arises when the members of the complex are brought into contact, and occurs without addition to or subtraction from any compound of any atom. The resulting complexes are generally stable under at least ordinary conditions of preparation, storage, and employment. Such complexes are, as is indicated by their various properties as will hereinafter be discuseed, compositions of matter all of whose parts are chemically bonded together, and not simple physical mixtures of the materials from which they are prepared. The noun complex is used in the instant specification and claims especially when the substances of the present invention are considered in amounts or masses greater than unitary, that is to say, greater than in molecular quantities.

The novel noun complectule is used to designate the smallest entire unit of a complex such as those of the present invention, and is analogous to the word "molecule." The term "molecule" is inapplicable as will be apparent hereinafter, yet because the smallest said units manifest constant stoichiometric relationships among their components, it has been found necessary to refer many properties of the present complexes to such smallest units.

The noun complectant is used generically to designate a molecular chemical substance which may be caused to unite with at least one atom of halogen in preparation of the present complexes. The complectant is the material whose properties have been observed to have the greater effect (of the effects of at least two kinds of members of the resulting complex) upon the solubility, physical state, and many other physical properties of the said complex. The present complectants are N-substituted cyclic carbamate compounds.

The noun complectate is used in the present specification and claims to designate the halogen which unites with the complectant in preparation of the present complexes; the complectate is the material whose properties have been observed to have the greater effect (of the effects of the two kinds of members of the resulting complex) upon many chemical and particularly biochemical properties of the complex. The present complectates comprise bromine, iodine, or both of them.

The regularly conjugated verb complect (past tense complected) is used in the transitive or intransitive sense to designate the action which may be a human action, of causing to unite in the sense of bringing about at least all of the necessary conditions to cause to unite, or the related chemical phenomenon of uniting, of the complectant and complectate to form, in a general sense, the complex, or, in the instantaneous and unitary sense, to form a complectule. The verb is analogous, in the chemical sense, to the verb "react"; however the action it sets forth is not a metathesis, produces no byproduct, does not involve valence change of any atom, and involves mechanisms and forces other than those involved in usual chemical reactions, as also will more fully appear hereinafter.

The noun complection is used to designate the state or fact on the part of a chemical substance of participating in the process of uniting of the complectant and complectate or to designate the said process; it is derived from the verb "complect" and is analogous to the noun "reaction" as derived from the verb "react."

When the theoretical maximum possible amount or ratio of the complectate is combined with complectant according to the stoichiometric complecting processes of the present invention, the resulting condition of either the complectant or of the resulting complex is identified by the adjective satisfied.

When a complectant or complex of the present invention exists in a condition less than satisfied, a ratio may be said to exist between its condition in fact, and its theoretical condition of satisfaction. This ratio may be expressed as either a common or decimal fraction, with respect to which the condition of satisfaction has the value of unity; and, correspondingly, the complectant alone has a value of zero or may be expressed as a percentage, with respect to which the condition of satisfaction has the value of 100 percent.

The foregoing neologisms are to be understood to be restricted in their application, in at least the present specification and claims, to relationships which are inherently stoichiometric in nature. Thus, application of the said neologisms is expressely foregone in any instance of relationships which are, at the molecular level, random or non-stoichiometric.

In view of these definitions, the present invention relates to novel complexes of halogen and N-substituted cyclic carbamate compounds, and is directed to a complex of halogen having an atomic weight of from 79 to 130, inclusive, and a member of the group consisting of the N-alkyl cyclic carbamates, N-haloalkyl cyclic carbamates, N-dihaloalkyl cyclic carbamates, and polymers of N-alkenyl cyclic carbamates, the unitary cyclic carbamates being characterized by the formula

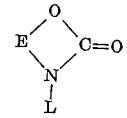

wherein E represents a divalent radical which is a member of the group consisting of hydrocarbons and halohydrocarbons containing from 2 to 18 carbon atoms, inclusive, and is also a member of the group consisting of orthophenylene, substituted orthophenylene, alkylene, cycloalkylalkylene, phenylalkylene, and naphthylalkylene, whereof the valences are separated by from 2 to 4 carbon atoms, inclusive, and L is a member of the group consisting of alkyl, haloalkyl, dihaloalkyl and alkenyl, said alkyl and alkenyl radicals containing from 2 to 3 carbon atoms, inclusive. The foregoing values for E and L are employed throughout the present specification and claims.

The naming of the present complectants may be based upon their structure as cyclic carbamates, in which instance the self-same compound may be known as polymerized N-vinyl-2-oxazolidinone, or as polymerized N-vinyl cyclic ethyl carbamate. In another nomenclature, they are identified as azlactones. Such variations in nomenclature are to be understood to be without weight as regards the actual identity or behavior of the compunds.

When the valences of the radical E are separated by two carbon atoms, that is to say, when they are valences of adjoining carbon atoms, the cyclic carbamate moiety comprises a 2-oxazolidinone or substituted 2-oxazolidinone, as such compound is commonly known, an oxazolidinone. When the said valences are separated by three carbon atoms, that is to say when they are valences of each of two carbon atoms with another carbon atom between, the said compounds comprise 3-alkenyl-tetrahydro-2H-1,3-oxazin-2-one and its derivatives and are commonly known as oxazinidinones. Similarly, when the valences of the radical E are separated by four carbon atoms, that is to say when they are valences of each of two carbon atoms with two other carbon atoms between, the present cyclic carbamates may be named as 3-alkenyl-tetrahydro-1,3-oxazepin-2-(3H)-one and its derivatives, and are commonly known as oxazepinanones. When the said valences are separated by two carbon atoms, that is to say when they are valences of adjacent carbon atoms which are adjacent members of a benzene ring, the compounds are commonly known as benzoxazolidinones.

The divalent radical represented by E is illustrated by alkylene groups such as dimethylene, normal trimethylene, normal tetramethylene, isopropylene, 2,3-butylene, 2,3-amylene, 2,4-amylene, 1,4-amylene, 1,2-hexylene, 1,3-amylene, 2,4-hexylene, 2,3-hexylene, 2,5-hexylene, 3,4-hexylene; by cycloalkyl-substituted alkylene groups as cyclohexyl ethylene, cyclohexyl propylene, 1-cyclohexyl-1,2-butylene, 1-cyclohexyl-1,3-butylene, 1-cyclohexyl-2,3-butylene, 2-cyclohexyl-1,2-butylene, 2-cyclohexyl-1,3-butylene, 2-cyclohexyl-1,4-butylene, and similar cyclopropyl, cyclobutyl, cyclopentyl, cycloheptyl and cyclooctyl alkylene derivatives; by such phenylalkylene and substituted phenylalkylene groups as phenylethylene, 1-phenyl-1,3-propylene, 1-phenyl-1,2-propylene, 1,3-diphenyl-1,2-propylene, 2-phenyl-1,3-propylene, (1-p-chlorophenyl) - 1,3-propylene, 3(m-chlorophenyl)-1,4-hexylene, 2(o-chlorophenyl)-1,4-amylene, 11(2,4-dichlorophenyl)2,4-dodecylene, 2(2,4,5-trichlorophenyl)-3,4-hexylene, and similar compounds wherein the substituent halogen is fluorine, bromine, or iodine, (p-tolyl)-dimethylene, 2(o-tolyl)-trimethylene, 1-(m-tolyl)-tetramethylene, p-hydroxyphenyl dimethylene, 5(o-hydroxyphenyl)-5,7-decylene; α-naphthylethylene; 1-(β-naphthyl)-trimethylene; also illustrative of phenylene and substituted o-phenylene radicals as representing the entire group E are such radicals as o-phenylene itself, 3-chloro-o-phenylene, 4-chloro-o-phenylene, and the various derivatives of such halophenylene radicals wherein the halogen ring substituent is fluorine, bromine, or iodine.

The alkenyl groups represented by L in the present complectants are illustrated by vinyl, allyl, and isopropenyl; the alkyl groups represented by L are illustrated by ethyl, n-propyl and isopropyl; and the halo- and dihaloalkyl groups represented by L are illustrated by chloroethyl, bromoethyl, iodoethyl, iodobromoethyl, dichloropropyl, and similar dihalosubstituted ethyl, propyl and isopropyl groups.

The complectant to be used, according to the present invention, to prepare a complex of halogen having an atomic weight of from 79 to 130, inclusive, then, is a member of the group consisting of the N-alkyl cyclic carbamates, N-haloalkyl cyclic carbamates, N-dihaloalkyl cyclic carbamates and polymers of N-alkenyl cyclic carbamates, wherein the N-alkenyl radical contains from 2 to 4 carbon atoms, inclusive, the N-alkyl radical contains from 2 to 4 carbon atoms, inclusive, the N-haloalkyl radical contains from 2 to 4 carbon atoms, inclusive and not more than 2 halogen atoms, and wherein the oxygen and nitrogen atoms are connected through a divalent bridging radical which is from 2 to 4 carbon atoms in length and which is at least a component of a radical selected from the group consisting of orthophenylene and substituted orthophenylene, alkylene, cycloalkylalkylene, phenylalkylene and naphthylalkylene, each said alkylene containing from 2 to 18 carbon atoms, inclusive.

The new complexes are liquids or solids which decompose at elevated temperatures without passing through a vapor phase and without yielding both starting materials in uncomplected form. Those which are solid become perceptibly softer at about the temperature of incipient decomposition but do not liquefy before decomposing. Thermal decomposition becomes clearly evident in such solids at temperatures not much above about 200° C. Each of the new complexes exhibits a characteristic absorption spectrum in at least the ultra-violet, visible light, and infra-red ranges, in that each absorbs the components of incident broad spectrum radiation more readily at some frequencies than at others. The new complexes are of various solubilities in water and in common organic solvents such as methanol, ethanol, glycerin, and dioxane. The complexes are substantially free of odor of halogen under ordinary conditions. They are stable over a substantial range of conditions and do not give up complected halogen when heated under subatmospheric pressure to temperatures below a temperature of general decomposition but at least as high as that at which uncomplected halogen is readily removed. Vigorous extraction of the complexes with a solvent in which the complexes are insoluble but halogen is soluble fails to remove the complexed halogen; for many of the present complexes, benzene in such solvent. Titration of the complexes with sodium thiosulfate solution in known procedures determines the entire quantity of complexed halogen therein, together with the quantity of uncomplexed halogen, if any be present. The new complexes are useful as parasiticides for the control of a wide variety of bacterial, fungal and insect organisms, and are adapted to be employed as germicides, and as preservatives for furs, leather, cloth and paper, and other proteinaceous or cellulosic materials.

The complexes of the present invention are prepared by causing at least one of iodine, bromine, or iodine and bromine together, to complect with a complectant which is a cyclic carbamate compound, at least a substantial proportion of whose units correspond to the formula

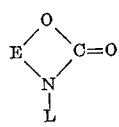

The complecting may be carried out in a liquid medium in which either or both of halogen and complectant may be suspended or dissolved, and takes place smoothly when halogen compectate is contacted with complectant at room temperature. When the complectate is iodine bromide, the resulting product is a co-complex of complected iodine and complected bromine. Following the complecting, the liquid medium, if employed, may be separated by filtration or evaporation according to the properties of the complex, the residue washed with an inert organic liquid in which halogen is soluble but the complex is insoluble, such as benzene or diethyl ether, to remove uncombined halogen and obtain the desired complex product as a liquid or more commonly a solid residue. The said complecting is readily brought about by bringing the said halogen and the said cyclic carbamate compound into contact one with another.

The degree of molecular aggregation and, correspondingly, the resulting macromolecular weight of the polymeric complectants when such are employed herein, is believed to be significant chiefly with respect to certain physical properties, but virtually without effect upon the ease of formation, or chemical or biological properties of the present complexes. Such complectants may vary within extreme limits, and many of them may be characterized by their Fikentscher K-values as described in Cellulosechemie, 13, 60 (1932). In particular, the K-values can be determined for those which are relatively free from cross-linking and which are soluble. In such case, determination of K-values is relatively reliable up to a K-value of about 200. Good results are obtained with the use, in the present invention, of complectants having K-values as high as at least 200. When the polymeric complectant is characterized by being significantly cross-linked, as may be the case, in particular, with copolymeric substances of which one or more members is characterized by having a plurality of ethylenically unsaturated copolymerizable moieties, the concept of the K-value according to Fikentscher soon ceases to have valid meaning, depending, as it does, upon solubility, a property which is rapidly diminished by cross-linking. Good results in the practice of the present invention have been obtained when employing as complectants, cross-linked copolymeric substances having molecular weights in excess of twenty million. It is pointed out that in such situation, the mechanical entanglement of one polymer molecule with another becomes sufficiently great that it becomes meaningless to regard molecular weight as it is regarded in respect to compounds of simpler structure. However, good results are obtained when employing lightly cross-linked, mildly cross-linked and highly cross-linked polymeric complectants. In particular, excellent results have been obtained when employing polymeric complectants so highly cross-linked that in the presence of such solvent as water, these substances exhibit 100 percent or more swelling. Illustrative of the cross-linking monomeric substances to be employed in the preparation of such cross-linked copolymers are divinylbenzene and acetyl triallylcitrate. The hydrogenated or N-haloalkyl monomer is successfully employed as complectant, as are also the low polymers.

Although the formation of the present complexes is believed to depend upon the presence of the

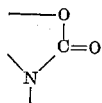

group in the cyclic carbamate moieties of which the above group is characteristic, polymerized complectants may contain as a portion of their monomeric members moieties which do not possess this group. Thus, for example, complexes of the present invention may readily be prepared employing, as complectants, starting polymeric materials which are copolymers of the N-alkenyl cyclic carbamates hereinbefore set forth, polymerized together with any other ethylenically unsaturated copolymerizable monomeric substance. Illustrative of the ethylenically unsaturated copolymerizable monomeric substances which may be employed in the preparation of complectants according to the present invention are 1,3-butadiene, 2,3-dimethyl-1,3-butadiene, isoprene, piperylene, 3-furyl-1,3-butadiene, 3-methoxy-1,3-butadiene, chloro-1,3-butadiene, 2-bromo-1,3-butadiene, 2-chloro-3-methyl-1,3-butadiene, styrene, p-chlorostyrene, p-methoxystyrene, α-methyl-styrene, vinylnaphthalene, acrylic acid, methacrylic acid, methyl acrylate, ethyl acrylate, methyl α-chloro-acrylate, methyl methacrylate, ethyl methacrylate, butyl methacrylate, methyl ethacrylate, acrylonitrile, methacrylonitrile, methacrylamide, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, N-vinyl pyrrolidone, N-vinyl-3-morpholinone, vinyl formate, maleic acid, itaconic acid, fumaric acid, crotonic acid, allyl alcohol, vinyl fluoride, 2-chloro-allyl alcohol, 1-allyloxy-3-chloro-2-propanol, N-vinylsuccinimide, N-tertiary butyl acrylamide, N-tertiary octyl acrylamide, 1,2-dichloropropene-2, 1,2-dichloropropene-1, trichlorostyrene, tetrachloro styrene, pentachloro styrene, o-methyl styrene, m-methyl styrene, p-methyl styrene, p-tertiary butyl styrene, p-isopropyl styrene, p-acetoxy styrene, p-phenyl styrene, p-benzoyl styrene, p-cyano styrene, m-nitro styrene, m-trifluoromethyl styrene, m-fluoro styrene, m-tertiarybutyl styrene, stearoyl styrene, oleoyl styrene, linoleoyl styrene, α-vinyl-naphthalene, β-vinyl-naphthalene, 1-(α-naphthyl)-propene-1, 2-(α-naphthyl)-propene-1, 2-(α-naphthyl)-butene-2, 3-(α-naphthyl)-pentene-2, 2-bromo-4-trifluoromethyl styrene, β-bromo-α,β-diiodo styrene, β-bromo-p-methyl styrene, β-bromo-p, β-dinitro styrene, m-secondary butyl styrene α,β-dibromo styrene, β,β-dibromostyrene, m-tertiarybutyl styrene, α-chloro-2,4,6-trimethyl styrene, α-chloro-2,3,4,6-tetramethyl styrene, β-chloro-o-nitrostyrene, 1-chloro-2-(p-tolyl)-1-butene, 4(1-chlorovinyl)-anisole, 2-(1-chlorovinyl)-4-methylanisole, 1-chloro-4-vinyl-naphthylene, 4(1-chlorovinyl)-2-isopropyl-5-methylanisole, 4(2-chlorovinyl)-2-isopropyl-5-methylanisole, cinnamic acid, p-cyclohexyl styrene, 2-ethyl-1-phenyl-1-butene, 3,5-diethyl styrene, eugenol, 4-fluoro-3-trifluoromethyl-α-methyl-styrene, α,α-trifluoro-m-propenyltoluene, isoeugenol, 2-isopropyl-5-methyl-4-vinyl anisole, safrole, isosafrole, 2-methyl-3-phenyl-2-pentenemethyl styryl ether, N,N-dimethyl-m-vinylaniline, vinylbenzenesulfonamide, 2-(α-naphthyl)-2-butene, 1,1-diphenylethylene, propenyl benzene, stilbene, 1-vinylacenaphthene, m-vinylaniline, p-vinylbenzoic acid, p-vinylbenzonitrile, p-vinylbiphenyl, 2-vinylfluorene, 6-vinyl-1,2,3,4-tetrahydro-naphthalene, p-vinylphenetole, o-vinylphenol, vinylbutyrate, vinylbenzoate, vinylquinoline, 2-vinylpyridine, 2-methyl-5-vinylpyridine, 4-vinylpyridine, 2-vinyl-5-ethylpyridine, N-vinylpyrrolidone, N-vinylphthalimide, N-vinylsuccinimide, N-vinylacetamide, N-vinyl-diacetimide, N,N-diallylacrylamide, diallylamine, diallylmethacrylamide, 2,5-dimethyl-3,4-dihydroxy-1,5-hexadiene, 2,5-dimethyl-2,4-hexadiene, divinylbenzene, divinyl ether of diethylene glycol, trivinyl benzene, 2,7-dimethyl-1,7-octadiene, 1,7-octadiene, p-diisopropenylbenzene, 1,3,5-triisopropenylbenzene, p,p'-diisopropenyldiphenyl, 1,1,3,5-tetrallyl-1,3-propanediol, 1,1,3,3-tetramethallyl-1,3-propanediol, 4,6-dimethyl-4,6-dihydroxy-1,8-nonadiene, 2,4,6,8-tetramethyl-4,6-dihydroxy-1,8-nonadiene, nonadiene-1,8-2,8-dimethylnonadiene-1,8, acetyl triallyl citrate, and the like, and the derivatives of such compounds as are known to those skilled in the art, including the esters of such compounds as are acids, alcohols, and phenols; the nuclear substituted derivatives thereof, the olefins such as ethylene, propylene, and the like; and other unsaturated hydrocarbons, esters, alcohols, acids, ethers, and so forth of the types described. Maleic anhydride may also be copolymerized with the present N-alkenyl-cyclic carbamate materials and with mixtures thereof with other ethylenically unsaturated copolymerizable monomeric substances in an amount which corresponds to not more than one half of the total number of monomeric moieties, to prepare a copolymeric complectant to be employed in the present invention. It is to be understood, as is well known to those skilled in the art, that preparation of the described polymers may call for any of a variety of catalysts including Ziegler catalysts, hydrogen peroxide or other peroxygen catalyst, and α,α'-azobis(isobutyronitrile), or a combination of such catalysts. Likewise, concentrations of monomers, polymerization temperatures, and (especially with respect to those copolymerizable materials which exist as gases under standard conditions) reaction pressure may be regulated in known ways according to the monomeric members employed and the polymeric members sought.

The present complectants usually complect to form the present complexes more readily than they react to form metathetical substitution products when in contact with the halogen complectate in non-aqueous medium and at room temperature, with the result that, even though potentially halogen-reactive substances be present, under the stated conditions the complexes of the present invention will usually be preferentially first formed.

For the production of the complexes of the present invention, it is essential that the complectate halogen be employed with the complectant in the proportion of at least 1 atom of halogen per complectant molecule. Preferably, when complectants are polymers, halogen should be employed in approximately the statistical average proportion of at least one halogen atom per fifty monomeric units in the complectant molecule. Although employment of a smaller proportion of halogen will produce a complex of the present invention, such complexes, containing smaller proportions of complected halogen, may have the disclosed useful properties in only a small degree. The preferred and more useful products are characterized by having at least one halogen atom per complectule and an average over-all ratio of from 0.02 to 1.0 halogen atom per complectant unit.

For the production of the complexes of the present invention when the complectant is composed exclusively of polymerized N-alkenyl cyclic carbamates, halogen should be employed in the statistical average proportion of at least one halogen atom per fifty recurrent cyclic carbamate monomeric units in the complectant molecule. Such products are characterized by having at least one halogen atom per complectule and an average overall ratio of from 0.02 to 1.0 halogen atom per cyclic carbamate monomeric unit. A more preferred embodiment of the present invention comprises the complexes containing, as an average, at least one halogen atom per each ten monomeric units of whatever kind.

In carrying out the present complecting, halogen having an atomic weight of from 79 to 130 may be dispersed together with complectant as a complection mixture in a liquid medium which may be solvent for either or both complex components. In an alternative procedure, the complecting may be carried out by intimately contacting the halogen and complectant together, as by mixing or grinding with a mortar and pestle or in a ball mill or the like, and in the absence of a liquid complection medium. Formation of the complex goes forward smoothly at temperatures in the range of from 10° to 100° C. When the preparation is carried out in a liquid phase, as in a solvent, the complecting is completed promptly, for example, in from less than one minute to about an hour. When the preparation is carried out in the absence of liquid, a longer time may be required for completion. In any case, it is advantageous to provide agitation which may include vibration at frequencies from subsonic to supersonic, stirring, recycle pumping, or, especially in the absence of liquid reaction medium may be milling, grinding, tumbling, or air agitation. Upon completion of the complecting, liquid medium, if employed, may be separated, according to the nature of the product, by filtration or evaporation and the residue washed or heated in vacuo as previously described to remove excess halogen and obtain the complex product as a solid residue.

The following examples illustrate the invention but are not to be considered as limiting it.

*Example 1.—Complex of Iodine and Polymeric 3-Vinyl-2-Oxazolidinone*

Polymeric 3-vinyl-2-oxazolidinone (10 grams) was intimately mixed and blended into a solution of 4.0 grams of iodine dissolved in 30 grams of methylene chloride and 450 milliliters of dry benzene. The polymeric complectant had a Fikentscher K-value of approximately 21 and was a finely divided colorless solid, insoluble in benzene and soluble in water; its 10 percent aqueous solution had a refractive index $n/D$ of 1.3477 at 25° C. Following the mixing and blending, the mixture was placed in a closed container and held at room temperature (21° C.) with continuous agitation for 1 hour to complete the formation of a complex. Thereafter, the complection mixture contained, in suspension, a precipitate product. The mixture was filtered, the residue washed repeatedly with diethyl ether, and the washed material dried at 50° C. for two hours under reduced pressure. Under these conditions, solvent and uncomplexed iodine were promptly removed but the complex including the complexed iodine was unaffected. As a result of these operations there was obtained a complex product of iodine and polymeric 3-vinyl-2-oxazolidinone. This product was a yellow powder which was freely soluble in water. The water solutions of the product were of a generally yellowred color, the solution viscosity and depth of color increasing as concentration of the product in solution increased. The infra-red and ultra-violet spectra evidenced a major hypsochromic displacement in the absorption maximum ascribable to the carbonyl group in the oxazolidinone ring. The product was infusible but softened and decomposed under atmospheric pressure at temperatures above approximately 288° C. The product was 15 percent satisfied; that is to say, the product contained an average iodine content of 0.15 iodine atom per monomeric moiety in the polymeric complectant or 14.8 percent by weight of total complex.

*Example 2.—Complex of Iiodine and Polymeric 5-Ethyl-3-Vinyl-2-Oxazolidinone*

In procedures exactly similar to those employed in Example 1, a complex was prepared from 4 grams of iodine and 10 grams of polymeric 5-ethyl-3-vinyl-2-oxazolidinone having a Fikentscher K-value of 16.4. A 10 percent ethanol solution of the polymer complectant had an index of refraction $n/D$ of 1.3706 at 25° C. The complex product was a light brown solid of very low solubility in water, but readily soluble in ethanol. The product was 9 percent satisfied; that is to say, it had an average iodine content of 0.09 iodine atom per monomeric unit, or 7.83 percent iodine by weight of total complex. The product was infusible but decomposed noticeably at temperature above about 205° C.

*Example 3*

In procedures exactly similar to those employed in Example 1, a complex is prepared from 4 grams of iodine and 20 grams of a copolymer of equimolecular proportions of monomeric 5-ethyl-3-vinyl-2-oxazoolidinone and styrene. As a result of such operations, a complex product is obtained as a light brown solid which in insoluble in water, soluble with difficulty in ethanol, and readily soluble in benzene, toluene, and xylene. The product has an average iodine content of 0.045 iodine atom per monomeric unit, corresponding to 0.09 iodine atom per monomeric cyclic carbamate unit and is, therefore, 9 percent satisfied. The product is infusible but decomposes noticeably, without separation into its starting materials at temperatures not much above 200° C.

*Example 4.—Complex of Iodine and Polymeric 5-Methyl-3-Vinyl-2-Oxazolidinone*

In procedures exactly similar to those employed in Example 1, a complex was prepared from 4 grams of iodine and 10 grams of a polymeric 5-methyl-3-vinyl-2-oxazolidinone having a Fikentscher K-value of 20.2. A 20 percent water solution of the polymer complectant had an index of refraction $n/D$ of 1.3480 at 25° C. In these operations, the complex product of iodine and 5-methyl-3-vinyl-2-oxazolidinone was obtained as a very pale yellow powder which was readily soluble in water. The product was infusible but decomposed with heating at temperatures above about 275° C., and had an average iodine content of 0.07 iodine atom per monomeric unit, or 6.94 percent iodine by weight of total complex.

*Example 5.—Complex of Iodine Bromide and Polymeric-3-Vinyl-2-Oxazolidinone*

Finely ground polymeric 3-vinyl-2-oxazolidinone having a Fikentscher K-value of 21.4 (5 grams) was intimately mixed and blended into a solution of 2.0 grams of iodine bromide in 250 milliliters of dry benzene, in which the complectant was practically insoluble. The mixture was placed in a closed container and agitated continuously for 12 hours at room temperature to complete the complection. Thereafter, the mixture was filtered and the residue washed repeatedly with diethyl ether, and subsequently dried at 50° C. for 2 hours under reduced pressure. As a result of these operations there was obtained a complex of iodine, bromine and polymeric 3-vinyl-2-oxazolidinone as a tannish-brown solid containing 8.05 percent bromine and 6.81 percent iodine both by weight of total condensation product and corresponding to an average of 0.19 halogen atom per monomeric unit.

*Example 6*

In procedures identical with those employed in Example 5, a complex is prepared employing finely powdered polymeric N-vinyl-7-phenyl-oxazepinanone having a Fikentscher K-value of approximately 40 and iodine bromide. The complection is carried out in anhydrous diethyl ether. As a result of these operations there is prepared a complex of N-vinyl-7-phenyl-oxazepinanone with iodine and bromine, which is a brown solid, decomposing without fusion and without yielding uncombined starting materials, upon heating.

*Example 7.—Complex of Iodine Bromide and Polymeric-5-Methyl-3-Vinyl-2-Oxazolidinone*

In procedures exactly similar to those employed in Example 5, a complex was prepared from 2 grams of iodine bromide and 5 grams of a polymeric 5-methyl-3-vinyl-2-oxazolidinone having a Fikentscher K-value of 24.8. The complex product was a tannish-brown solid containing 5.52 percent bromine and 1.42 percent iodine by weight of total complex, and corresponding to an average of 0.07 atom of halogen per monomeric unit.

*Example 8.—Complex of Iodine Bromide and Polymeric 5-Ethyl-3-Vinyl-2-Oxazolidinone*

In the manner described in Example 5, a complex was prepared from 2.0 grams of iodine bromide and 5.0 grams of a polymeric 5-ethyl-3-vinyl-2-oxazolidinone having a Fikentscher K-value of 23.5. The complex product was a tannish-brown solid containing 4.64 percent bromine and 2.61 percent iodine by weight of total product, and corresponding to an average of 0.11 halogen atom per monomeric unit in the polymeric starting material.

*Example 9.—Complex of Iodine and Polymeric N-Vinyl-2-Oxazinidinone*

A solution consisting of 2 grams iodine in 10 milliliters methylene chloride was diluted by the addition of 150 milliliters dry benzene. To the resulting solution was added 5 grams of a polymeric N-vinyl-2-oxazinidinone having a Fikentscher K-value of 59.3. The polymer complectant was initially colorless and insoluble in the said solution; immediately upon contact with the said solution the complectant assumed a yellow-orange color. The suspension of complectant in halogen solution was shaken over night to carry the complection to completion. Thereafter, the resulting suspension was filtered and a light-orange solid residue removed, washed with excess diethyl ether and heated under subatmospheric pressure at approximately 50° C. to vaporize and remove liquids and free halogen. The resulting complex was water-soluble, practically odorless, of a light yellow-orange color, and upon heating softened perceptibly with decomposition at about 275° C. Upon analysis, the complex was found to contain 19.57 percent iodine which was quantitatively determined by titration with sodium thiosulfate.

*Example 10.—Complex of Bromine and Polymeric 3-Vinyl-2-Oxazolidinone*

Finely divided polymeric 3-vinyl-2-oxazolidinone (10 grams) having a Fikentscher K-value of 21 was intimately mixed and blended into a deep red solution of 5 grams of bromine in 500 milliliters of carbon tetrachloride. The mixture was agitated at room temperature for eight hours to complete the complection. During the complecting a product formed therein as a precipitated solid. The resulting mixture was filtered, the filtrate washed repeatedly with carbon tetrachloride, and the washed filtrate dried for 2 hours under reduced pressure at 50° C. As a result of these operations, there was obtained a complex of bromine and polymeric 3-vinyl-2-oxazolidinone as a yellow-tan solid product having a bromine atom per monomeric unit or 30.64 percent bromine by weight of total complex product.

*Example 11.—Complex of Bromine and Polymeric 5-Methyl-3-Vinyl-2-Oxazolidinone*

In the manner described in Example 10, a complex product was prepared from 5 grams bromine and 10 grams of a polymeric 5-methyl-3-vinyl-2-oxazolidinone having a Fikentscher K-value of 21.7. The product was a finely divided solid containing 22.1 percent bromine by weight of total complex, corresponding to 0.45 bromine atom per monomeric unit.

*Example 12.—Complex of Bromine and Polymeric 5-Ethyl-3-Vinyl-2-Oxazolidinone*

In procedures exactly similar to those employed in Example 10, a complex was prepared from 5 grams of bromine and 10 grams of a polymeric 5-ethyl-3-vinyl-2-oxazolidinone having a Fikentscher K-value of 18. The product was a solid material containing 34.1 percent bromine by weight of total complex, corresponding to 0.91 bromine atom per monomeric unit.

*Example 13*

Finely divided polymeric N-vinyl-2-oxazinidinone having a Fikentscher K-value of 59.3 (5 grams) was intimately mixed and blended into a deep red solution of 2.5 grams bromine dissolved in 150 milliliters carbon tetrachloride. The resulting mixture was placed in a closed container and agitated at room temperature for approximately 8 hours to complete the complection. During this time the polymer, originally colorless, assumed a light yellow color. Upon completion of the formation of the complex, the resulting solid was separated by filtration, washed with excess diethyl ether, and heated at 50° C. for a period of time under subatmospheric pressure to vaporize and remove solvent and uncombined halogen. The resulting complex was of a light yellow color, practically odorless, readily soluble in water, and softened with decomposition at around 270° C. Upon analysis, it was determined that the complex contained 30.12 percent bromine by weight.

*Example 14*

A copolymeric complectant having a K-value of 120 is prepared from, as monomeric materials, 1 gram mole of N-isopropenyl-5-cyclohexyl-oxazinidinone, 1 gram mole of 5-β-naphthyl-N-vinyl-oxazolidinone and 0.25 gram mole each of methyl methacrylate, vinyl acetate, and maleic anhydride. The said copolymer is employed as complectant in the present invention, to prepare a complex with iodine. In such operation, the iodine (10 grams) is dissolved in 1 liter carbon tetrachloride and to this is added, slowly, portionwise, and with stirring, 50 grams of the said copolymer as a white, that is to say, colorless, finely divided solid. The resulting mixture is shaken overnight to carry the complection to completion. As a result of these operations, there is obtained an iodine complex of the copolymer of N-isopropenyl-5-cyclohexyl-oxazinidinone, 5-β-naphthyl N-vinyl-oxazolidinone, methyl methacrylate, vinyl acetate and maleic anhydride. The said complex is a brown solid which decomposes with softening when heated at temperatures not much above 250° C.

*Example 15*

A polymeric complectant having a K-value of 80 is prepared by copolymerizing 1 gram mole of N-allyl-5-cyclopentyloxazepinanone, 1 gram mole of 5-decyl-N-allyl-oxazolidinone and 0.25 gram mole of 5-methyl-N- allyl-oxazolidinone. The resulting polymer is employed as complectant in the present invention to prepare a complex with bromine. In such operation, the bromine (10 grams) is dissolved in 1 liter of carbon tetrachloride and to this is added, slowly, portionwise, and with stirring, 50 grams of the said copolymer as a white, that is to say, colorless, finely divided solid which immediately upon contact with the halogen solution, assumes a yellow color. The resulting mixture is shaken overnight to carry the complection to completion. As a result of these operations, there is obtained a bromine complex of the said copolymer. The complex is a yellowish-tan solid which decomposes with softening, without yielding uncombined starting materials, when heated at temperatures not much above 250° C.

*Example 16*

Polymeric 5-ethyl-3-vinyl-2-oxazolidinone having a Fikentscher K-value of 23.5 (2.0 grams) was dissolved in 100 milliliters of methylene chloride. To this solution was added 2 grams of iodine, and the resulting mixture stirred until the iodine dissolved. The mixture was thereafter placed in an evaporating dish and allowed to evaporate to dryness during a period of 12 hours. The residue therefrom was then successively washed with dry benzene and diethyl ether and the washed product dried at 50° C. for 2 hours under reduced pressure. As a result of these operations, there was obtained a complex of iodine and polymeric 5-ethyl-3-vinyl-2-oxazolidinone having an iodine content of 8.2 percent by weight of total complex corresponding to 0.10 iodine atom per monomeric unit. The product is infusible but decomposes at temperatures above 200° C.

*Example 17*

A 0.5 percent aqueous solution containing 2.0 grams polymeric 3-vinyl-2-oxazolidinone (Fikentscher K-value of 60) is combined with a 0.5 percent ethanol solution containing 2.12 grams of iodine. The mixture is stirred at room temperature for 1 hour, the solvent and uncomplexed halogen removed by evaporization and the solid residue washed with diethyl ether. As a result of these operations, there is obtained a satisfied complex product of iodine and polymeric 3-vinyl-2-oxazolidinone containing one atom of iodine per monomeric unit, or 52.6 percent iodine by weight of product.

*Example 18*

Polymeric 3-vinyl-2-oxazolidinone (25 grams) having a Fikentscher K-value of 21 was mixed and blended in 100 milliliters of water to produce a viscous solution. To this solution was added 25 grams of finely powdered iodine. The resulting mixture was held at room temperature for 8 hours with constant agitation. Thereafter the mixture was transferred to an evaporating dish, evaporated to dryness with gentle warming and the dried product washed several times with diethyl ether. As a result of these operations, there was obtained a complex product of iodine and polymeric 3-vinyl-2-oxazolidinone which contained 20 percent iodine by weight of total complex or an average of 0.22 iodine atom per monomeric unit.

*Example 19*

Polymeric 3-vinyl-2-oxazolidinone (10 grams) having a Fikentscher K-value of 12 is mixed with 10 grams of finely powdered iodine and the resulting mixture vigorously ball-milled at room temperature for 24 hours. Thereafter, the product is washed with diethyl ether until no further color is imparted to the ether. As a result of these operations, there is obtained a complex of iodine and polymeric 3-vinyl-2-oxazolidinone as a yellow solid which decomposes with heating above 275° C. and contains 5 weight percent of iodine.

*Example 20*

Finely ground polymeric 5-phenyl-3-vinyl-2-oxazolidinone having a Fikentscher K-value of 25.5 (10 grams) is added to a solution of 5 grams of iodine in 100 milliliters of diethyl ether, and the resulting mixture stirred at room temperature (about 21° C.) for a short period, and thereafter evaporated to dryness. The residue is then washed with further diethyl ether and the resulting product oven dried at 50° C. under reduced pressure for 2 hours to yield a complex of iodine and polymeric 5-phenyl-3-vinyl-2-oxazolidinone as an infusible yellowish-brown powder which decomposes at temperatures above 200° C. and contains 15 weight percent of iodine.

*Example 21*

N-ethyl oxazolidinone, 9.9 grams (approximately 0.1 gram/mole), a colorless liquid at room temperature (about 22° C.), is poured slowly and with continuous stirring into 1 liter dry diethyl ether in which is dissolved 30 grams iodine. Stirring of the resulting complection mixture at room temperature is continued for 1 hour to carry the complection to completion. The resulting mixture is thereafter fractionally distilled at gradually rising temperatures and under gradually declining sub-atmospheric pressures whereby there are removed first, diethyl ether solvent and, thereafter, uncomplexed iodine. Heating is continued for a period of time at an upper limit temperature of about 40° C. and a lower limit pressure of approximately 1 millimeter of mercury. Under these conditions, uncomplexed iodine is removed. The resulting residue is a reddish-brown liquid comprising N-ethyl oxazolidinone and iodine bonded together as a complex. The product is practicaly free from odor of iodine and weighs approximately 22.6 grams. In the infrared spectrum of the complex, there is observed a major hypsochromic displacement in the absorption maximum ascribable to the carbonyl group in the oxazolidinone ring.

In procedures exactly like the foregoing, an iodine complex is prepared, employing as complectant the compound N-isopropyl oxazinidinoe (which may also be called a 2H-1,3-oxazin-2-one; tetrahydro-3-isopropyl). The resulting liquid complex is brown in color, soluble in water and in ethanol and appears, superficially, to be of about the same viscosity as water.

*Example 22*

A copolymer having a Fikentscher K-value of approximately 25.0 and prepared from the mixed monomers 5-phenyl - 3 - vinyl-2-oxazepinanone and 3-vinyl-2-oxazolidinone in approximately equimolecular proportions (10.0 grams) is added as a fine powder to a solution of 10 grams of iodine bromide in 500 milliliters diethyl ether and the resulting mixture stirred at room temperature for a short time. The mixture is then filtered, and the residue washed with ether and thereafter dried for 2 hours at 50° C., under reduced pressure, to obtain a complex of iodine bromide and a copolymer of 5-phenyl-3-vinyl-2-oxazolidinone and 3-vinyl-2-oxazolidinone. The complex contains 18 percent by weight of halogen and is an infusible solid, but decomposes at temperatures above 200° C.

In similar procedures, other complexes of the present invention may be prepared from halogen having an atomic weight of from 79 to 130 and such complectants as have been hereinbefore set forth, at least the complex-forming moieties of which must be cyclic carbamate materials; that is to say, must contain the group

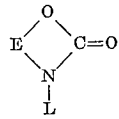

The complexes of the present invention are useful as parasiticides for the control of a wide variety of organisms including fungi, such as tomato late blight; bacteria; molluscs such as slugs and snails; and arthropods including arachnids and insects. They are adapted to be applied to the foliage of plants in amount sufficient to control the parasitic organisms without appreciable injury to the plants.

For such use the products may be applied in unmodified form, or may be dispersed on inert finely divided solids and employed as dusts. Also, such mixture may be dispersed in water with or without the aid of soaps or surface active dispersing agents and the resulting aqueous suspensions employed as sprays. In other procedures, the products may be employed in oils or in solvent, or the resulting compositions may be used as constituents of compositions comprising water and soap or a surface active dispersing agent such as an aqueous emulsion or dispersion. Further, the solvent compositions of the products may be employed as aerosols.

In an operation representative of a bactericidal utility, 0.5 milliliter of 24 hour broth culture of *Salmonella typhosa* was added to ten milliliters of aqueous solution containing 3.4 milligrams of the complex of iodine and polymeric 3-vinyl-2-oxazolidinone of Example 1. At 30 second, one minute, and five minute intervals following the addition, aliquots of the mixture were removed, and thereafter cultured in nutrient broth and incubated for 24 hours at 37° C. Examination of the incubated broth cultures showed that the complex had given a 100 percent kill of the Salmonella test organism at all exposure intervals. The other complexes of the present invention are similarly bactericidal.

In an operation representative of the utility of safening, that, is rendering innocuous, water contaminated by pathogenic bacteria, one half milliliter of a culture of *Escherichia coli* prepared by the dilution of one part of 24 hour standard broth culture into 50 parts of test sub-culture was treated by addition to it of 10 milliliters aqueous solution of a complex containing 22.1 weight percent bromine and polymeric 5-methyl-N-vinyl oxazolidinone in the concentration of 20 parts of said complex per million parts of solution. An aliquot thereof taken after 5 minutes was returned to a broth culture medium and maintained under favorable growing conditions for a period of time and thereafter examined, whereupon it was ascertained that no growth of the microorganism in the treated sub-culture had resulted. Other complexes of the present invention manifest a similar utility, allowance being made for solubility and dispersibility in the medium employed.

The homopolymers or copolymers employed as complectants in accordance with the teachings of the present invention may be prepared in known methods by polymerizing the corresponding monomer or mixture of monomers in a reaction medium such as water. In such operations, the polymerization is carried out in the presence of a small amount, for example 0.5 weight percent, of a polymerization catalyst such as hydrogen peroxide or other peroxygen-type material, or α,α'-azobis(isobutyronitrile), and at a temperature in the range of from 50° C. to 100° C. Upon completion of the polymerization reaction, the reaction solvent may be removed by evaporation under reduced pressure to obtain the polymeric or copolymeric complectant as a solid residue.

When it is desired to obtain the low-molecular weight polymers of the present invention, for example the dimer, the trimer, and the other low polymers up to and including at least the decamer, the polymerization is carried out at a temperature in the upper portion of the polymerization temperature range, for example at 80°–90° C., and in the presence of a relatively larger amount, for example two to three weight percent of catalyst. Upon completion of the polymerization, the resulting mixture is further heated to coagulate high molecular-weight polymers. Such coagulation solidifies and thus expedites separation of the polymers having a molecular weight above about 5,000. This higher fraction may be separated by filtration, decantation, centrifugation, and the like and thereafter removed; and the resulting liquid fraction employed in the present invention. If desired, the liquid fraction may be fractionally distilled under gradually declining subatmospheric pressure and gradually increasing temperatures to separate the individual low polymers, those of lower molecular weight being volatile under higher pressures and at lower temperatures than those of higher molecular weight.

The monomeric N-alkenyl cyclic carbamate compounds used as intermediates for the preparation of the present complectants may be prepared by known methods wherein a 3-(2-chloroalkyl)-2-oxazolidinone, oxazinidinone or oxazepinanone, or a suitable substituted 3-(2-chloroethyl)-2-oxazolidinone, oxazinidinone or oxazepinanone is dehydrochlorinated with an alkaline material such as a potassium lower alkoxide. These monomers are colorless liquids of various solubility in water and in many common organic solvents. They are generally stable in storage, no special precautions against spontaneous polymerization being required.

The 3-(2-chloroalkyl)-2-oxazolidinones, oxazinidinones and oxazepinanones and substituted derivatives thereof may be prepared by the known reaction of a haloalkyl alkanolamine such as 2-hydroxyethyl-2-chloroethyl amine, and ethylene carbonate, whereby the N(2-chloroalkyl)-cyclic carbamate is formed, together with ethylene glycol of reaction. Substituents upon the hydroxyethyl moiety of the alkanolamine appear as substituent portions upon the group represented by E in the foregoing general formula; with the result that preparation of the desired complectants unsubstituted or with substituents in any desired variety is readily carried out.

The monomeric N-alkenyl cyclic carbamates may also be prepared in a transalkenylation reaction which is generically called transvinylation, which takes place in the manner indicated by the following typifying equation:

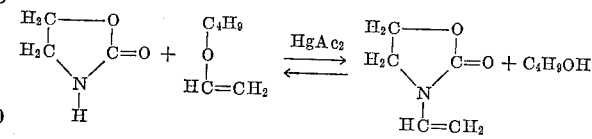

Advantageously the reaction takes place at a temperature in the range of 140° C.–160° C., and with the reactants and catalyst dispersed in a hydroxy-free liquid reaction medium which may be dimethyl formamide. Some acetal by-products are ordinarily prepared in the course of the reaction. Other catalysts, including mercuric benzoate, zinc acetate, and phenyl mercuric acetate may be employed in place of, or in combination with mercuric acetate. Alkenyl groups other than vinyl groups may also be introduced as N-substituents upon the cyclic carbamate in other embodiments of the same general reaction. The benzoxazolidinones and substituted benzoxazolidinones may be prepared by known procedures, for example oxidation of salicylic acid amide or ring-substituted salicyclic acid amide in aqueous solution at about 80° C. with sodium hypochlorite in a concentration corresponding to 5 weight percent chlorine. Under these conditions the said amide not only oxidizes but the oxidation derivatives undergo a simultaneous rearrangement to prepare the desired benzoxazolidinone in a single step preparation. Upon completion of the said rearrangement oxidation, the aqueous mixture is cooled, whereupon the desired benzoxazolidinone precipitates as a crystalline solid and may thereafter be removed by filtration and, if desired, washed with further water or recrystallized from solvents such as benzene.

The benzoxazolidinones thus prepared may be transalkenylated in the manner hereinbefore set forth and the resulting monomeric N-alkenyl benzoxazolidinones may thereafter be employed as complectants in the preparation of the present complexes, may be alkenyl-hydrogenated or halogenated or polymerized or copolymerized in the manners hereinbefore set forth, and thereafter employed according to the present invention.

The present application is a continuation-in-part of our copending application Serial Number 719,483, filed March 6, 1958 and now abandoned.

We claim:

1. A complex of halogen having an atomic weight of from 79 to 130, inclusive, and a member of the group consisting of the N-alkyl cyclic carbamates, N-haloalkyl cyclic carbamates, N-dihaloalkyl cyclic carbamates and polymers of N-alkenyl cyclic carbamates, wherein the N-alkenyl radical contains from 2 to 4 carbon atoms, inclusive, the N-alkyl radical contains from 2 to 4 carbon atoms, inclusive, the N-haloalkyl radical contains from 2 to 4 carbon atoms, inclusive, and not more than 2 halogen atoms, and wherein the oxygen and nitrogen atoms are connected through a divalent bridging radical which is from 2 to 4 carbon atoms in length and which is at least a component of a radical selected from the group consisting of orthophenylene and substituted orthophenylene, alkylene, cycloalkylalkylene, phenylalkylene and naphthylalkylene, each said alkylene containing from 3 to 18 atoms, inclusive.

2. A complex of iodine and polymeric 5-methyl-N-vinyl-2-oxazolidinone.

3. A complex of iodine and polymeric 5-ethyl-N-vinyl-2-oxazolidinone.

4. A complex of bromine and polymeric 5-methyl-N-vinyl-2-oxazolidinone.

5. A complex of bromine and polymeric 5-ethyl-N-vinyl-2-oxazolidinone.

6. A complex of iodine and polymeric N-vinyl-2-oxazinidinone.

References Cited in the file of this patent

UNITED STATES PATENTS

| | | |
|---|---|---|
| 2,665,271 | Beller | Jan. 5, 1954 |
| 2,706,701 | Beller et al. | Apr. 19, 1955 |
| 2,739,922 | Shelanski | Mar. 27, 1956 |
| 2,786,043 | Schuller et al. | Mar. 19, 1957 |
| 2,844,590 | Cameron | July 22, 1958 |
| 2,847,407 | Kosmer | Aug. 12, 1958 |
| 2,853,416 | Kellog | Sept. 23, 1958 |
| 2,853,417 | Werner et al. | Sept. 23, 1958 |
| 2,900,305 | Siggia | Aug. 18, 1959 |
| 2,905,690 | Bakke | Sept. 22, 1959 |
| 2,948,656 | Tousignant et al. | Aug. 9, 1960 |
| 2,987,505 | Werner | June 6, 1961 |

OTHER REFERENCES

Drechsel: Journal of Organic Chemistry, volume 22, pages 849–851, July 1957.

UNITED STATES PATENT OFFICE
CERTIFICATE OF CORRECTION

Patent No. 3,133,904                                      May 19, 1964

William F. Tousignant et al.

It is hereby certified that error appears in the above numbered patent requiring correction and that the said Letters Patent should read as corrected below.

Column 10, line 7, after "having a" insert -- bromine content of 0.62 --; column 15, line 21, after "18" insert -- carbon --.

Signed and sealed this 6th day of October 1964.

(SEAL)
Attest:

ERNEST W. SWIDER
Attesting Officer

EDWARD J. BRENNER
Commissioner of Patents